(12) United States Patent
Li et al.

(10) Patent No.: US 11,754,989 B2
(45) Date of Patent: *Sep. 12, 2023

(54) SEMICONDUCTOR EQUIPMENT MANAGEMENT METHOD, ELECTRONIC DEVICE, AND NON-TRANSITORY COMPUTER READABLE STORAGE MEDIUM

(71) Applicant: Taiwan Semiconductor Manufacturing Company, Ltd., Hsinchu (TW)

(72) Inventors: Sing-Tsung Li, Taichung (TW); Hsu-Shui Liu, Taoyuan (TW); Jiun-Rong Pai, Hsinchu County (TW); Sheng-Hsiang Chuang, Hsinchu (TW); Shou-Wen Kuo, Hsinchu (TW); Chien-Ko Liao, Taichung (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 369 days.

This patent is subject to a terminal disclaimer.

(21) Appl. No.: 17/098,452

(22) Filed: Nov. 16, 2020

(65) Prior Publication Data

US 2021/0063984 A1 Mar. 4, 2021

Related U.S. Application Data

(63) Continuation of application No. 16/028,422, filed on Jul. 6, 2018, now Pat. No. 10,852,704.

(Continued)

(51) Int. Cl.
*G05B 19/042* (2006.01)
*G06T 7/00* (2017.01)

(52) U.S. Cl.
CPC ......... *G05B 19/042* (2013.01); *G06T 7/0004* (2013.01); *G05B 2219/31202* (2013.01); *G06T 2207/30148* (2013.01)

(58) Field of Classification Search
CPC ........ G05B 19/042; G05B 2219/31202; G05B 19/41865; G05B 2219/32252; G06T 7/0004; G06T 2207/30148
See application file for complete search history.

(56) References Cited

U.S. PATENT DOCUMENTS 10,852,704 B2 * 12/2020 Li ..................... G05B 19/042
2002/0065900 A1 * 5/2002 Dor ..................... H01L 22/20
709/217

(Continued)

*Primary Examiner* — Charles R Kasenge
(74) *Attorney, Agent, or Firm* — JCIPRNET

(57) ABSTRACT

A semiconductor equipment management method applicable to an electronic device for managing multiple pieces of semiconductor equipment is provided. The pieces of semiconductor equipment are respectively controlled through multiple control hosts, and the control hosts and the electronic device are connected to a switch device. The method includes: receiving real-time image information of each control host through the switch device; determining whether the real-time image information of each control host includes a triggering event by performing an image recognition on the real-time image information; executing a macro corresponding to the triggering event, where the macro includes at least one self-defined operation; generating at least one input command according to the self-defined operation of the executed macro; and controlling the control hosts to execute the self-defined operation of the executed macro by transmitting the input command to the control hosts through the switch device.

20 Claims, 6 Drawing Sheets

Related U.S. Application Data

(60) Provisional application No. 62/592,405, filed on Nov. 30, 2017.

(56) References Cited

U.S. PATENT DOCUMENTS

| | | | | |
|---|---|---|---|---|
| 2002/0072162 A1* | 6/2002 | Dor | ............. | H01L 22/20 |
| | | | | 438/200 |
| 2002/0161532 A1* | 10/2002 | Dor | ............. | H01L 22/20 |
| | | | | 702/35 |
| 2013/0028506 A1* | 1/2013 | Salter | ............. | G01N 21/8851 |
| | | | | 382/145 |

* cited by examiner

1. Define this Macro Item  ☐ Wait or check status on initial  Timeout Limit (min) [30]

2. Edit this Macro Item Step by Step

| Step Name | Kernel Function | Next id (Fail) | Next id (Success) | Delay Time (ms) |
|---|---|---|---|---|
| Click Control System | ROI Find and Click | 8 | 10 | 2000 |

Parameter

ControlSystem, 0, 0, 0, 105, 281, 289, 20160713_164822.png; System_system, -2, 35, 24

[📝 Parameter]  [✏️ Apply Change]  [➕ Add Step]

| ID | Step Name | Kernel Function | Parameter | Next id (Fail) | Next id (Success) | Delay Time (ms) |
|---|---|---|---|---|---|---|
| 1 | Step 1 – Check "CH**" chamber idle | ROI Pattern Match (Color) | ChA_idle, 48, 90 | 2 | 8 | 2000 |
| 2 | Step 2 – Click Running Chamber "Ch**" | ROI Find and Click (Color) | ChA running, 0, 0 | 1 | 4 | 1000 |
| 3 | Step 3 – Click idle chamber "ch**" | ROI Find and Click (Color) | ChA, 0, 0, 53, 92, 1 | 2 | 8 | 2000 |
| 4 | Step 4 – Click Monitor Process | Full screen Find and Click | Monitor Process | 2 | 5 | 1500 |
| 5 | Step 5 – Click Recipe Action | Full screen Find and Click | RecipeAction, 0 | 4 | 6 | 1500 |
| 6 | Step 6 – Click End Recipe | Full screen Find and Click | End Recipe, 0, 0, | 5 | 7 | 3000 |
| 7 | Step 7 – Check "Ch**" idle | ROI Pattern Match (Color) | ChA_idle, 56, 96, | 2 | 8 | 500 |
| 8 | Step 8 – Click system | ROI Find and Click | System, 0, 0, 4, 74 | 8 | 9 | 2000 |
| 9 | Step 9 – Click Control System | Full Screen Find and Click | ControlSystem | 6 | 10 | 2000 |
| 10 | Step 10 – Go Clean Page | Full Screen Find and Click | Lost-Sequence | 8 | 11 | 2000 |
| 11 | Step 11 – Search Idle Purge Column | Full Screen Pattern Match | Idle Purge-Cass | 12 | 13 | 2000 |
| 12 | Step 12 – Click More to Next Page | Full Screen Find and Click | More, 0, 0, 20161 | 8 | 12 | 1000 |
| 13 | Step 13 – Click "Ch**" Recipe Page | Full Screen Find and Click | ChA idle purge | 11 | 13 | 3000 |
| 14 | Step 14 – Check Recipe Show | Full Screen Pattern Match | pageup, 201612 | 13 | 11 | 2000 |
| 15 | Step 15 – Go Page End | Enter Special Key | FF57 | 0 | 14 | 1000 |
| 16 | Step 16 – Jump to F word | Keyboard Key Chars | f | 0 | 15 | 1000 |

[📂 Open]  [💾 Save]  [💾 Save as]  [⬆ Exit]

FIG. 5

SEMICONDUCTOR EQUIPMENT MANAGEMENT METHOD, ELECTRONIC DEVICE, AND NON-TRANSITORY COMPUTER READABLE STORAGE MEDIUM

CROSS-REFERENCE TO RELATED APPLICATION

This application is a continuation application of U.S. application Ser. No. 16/028,422, filed on Jul. 6, 2018, now allowed, which claims the priority benefit of U.S. provisional application Ser. No. 62/592,405, filed on Nov. 30, 2017. The entirety of each of the above-mentioned patent applications is hereby incorporated by reference herein and made a part of this specification.

BACKGROUND OF THE DISCLOSURE

Field of the Disclosure

The disclosure relates to a process management, and in particular, to a semiconductor equipment management method, an electronic device, and a non-transitory computer readable storage medium for remote and automated management.

Description of Related Art

Due to high-capacity demands, production facilities are generally installed with large amounts of processing equipment of the same or related types. In terms of wafer production, the production process may be roughly divided into steps including wafer fabrication, wafer probe, packaging, and initial/final testing, and more than one piece of equipment is required to complete the foregoing steps in the production process. For example, in wafer fabrication, a wafer undergoes processes including cleaning, oxidation, deposition, lithography, etching, ion implantation, etc.

To achieve higher yields, the temperature, humidity, and dust content of the environment during the foregoing processes need to be well controlled. Moreover, to achieve higher capacities, it may be necessary to install multiple pieces of the same equipment to parallelize the process. Accordingly, to operate the processing equipment in large amounts, many businesses usually need to spend much manpower and time to perform routine management operations on each of the processing equipment one by one, which thus incurs a lot of costs.

In light of the above, if an efficient management method can be provided to reduce the manpower and time spent on the routine management operations, it will be able to save a lot of costs for the businesses, and it is also one of the aims that persons skilled in the art collectively strive to achieve.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 5 is a schematic diagram illustrating editing a plurality of self-defined operations of a macro according to an embodiment of the disclosure.

DESCRIPTION OF THE EMBODIMENTS

Figure 1:
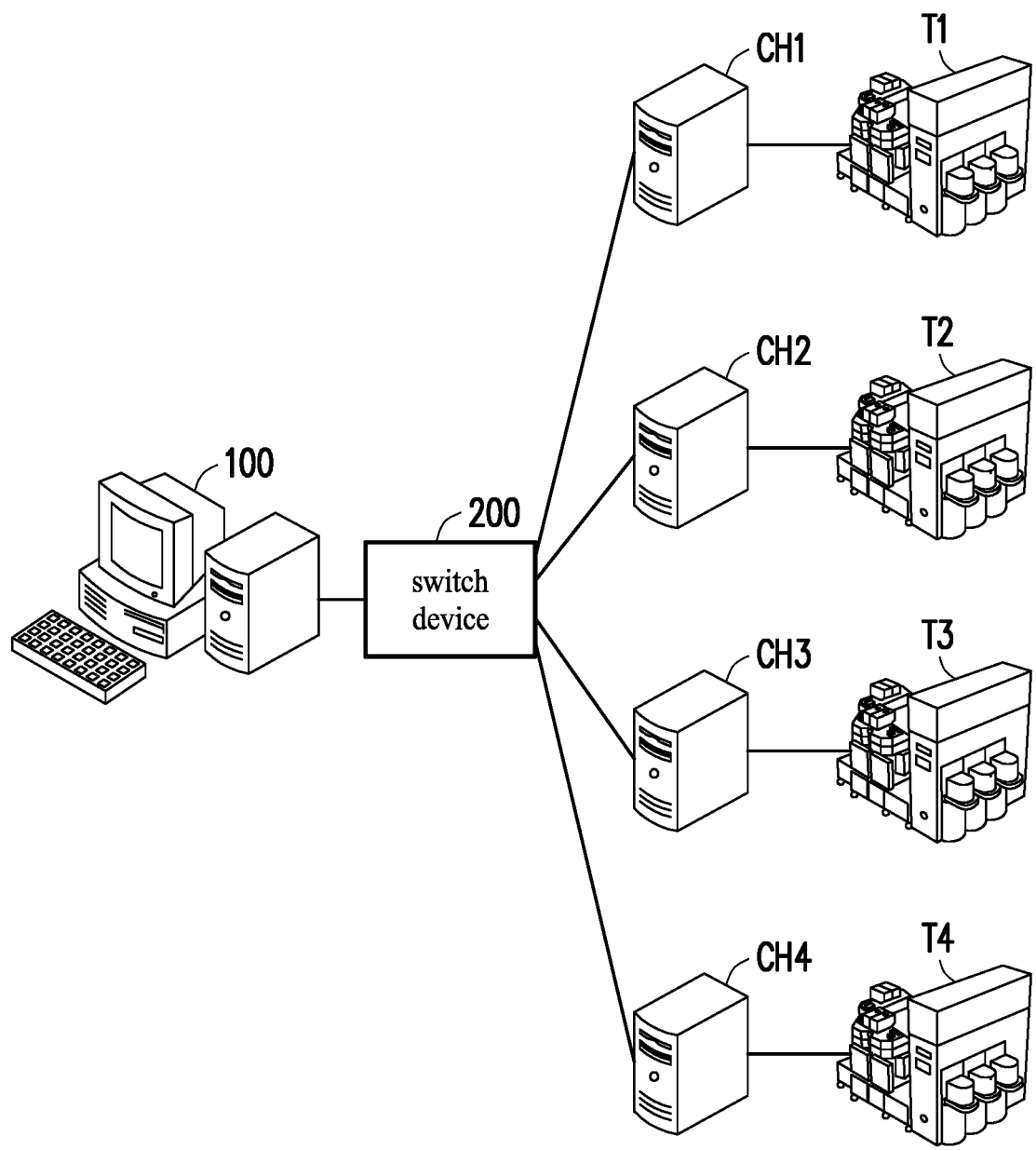
FIG. 1 is a schematic diagram illustrating an environment of a semiconductor equipment management method according to an embodiment of the disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

The present embodiment provides a semiconductor equipment management method. In brief, the method creates an excellent management environment for a plurality of pieces of semiconductor equipment, where each piece of semiconductor equipment is controlled by a control host, and the control hosts are respectively connected to a switch device such as a KVM switch. During management, a management host is connected to the switch device as well, so that signals can be bi-directionally transmitted between the management host and the control hosts through the switch device and the plurality of pieces of semiconductor equipment can be remotely controlled by the management host through the control hosts. In particular, the semiconductor equipment management method of the present embodiment further provides a macro editing interface that is not difficult to get started with and is easy to learn to allow a manager to self-edit a macro used for solving specific unexpected sudden events. Such management environment can significantly reduce the costs spent on routine equipment operations and accelerate elimination of obstacles encountered by the semiconductor equipment. Therefore, management burden of large amounts of equipment in semiconductor techniques can be significantly reduced in a remote and automated manner.

FIG. 1 is a schematic diagram illustrating an environment of a semiconductor equipment management method according to an embodiment of the disclosure. Referring to FIG. 1, as the management host, an electronic device 100 controls control hosts CH1 to CH4 through a switch device 200, wherein the control hosts CH1 to CH4 are respectively configured to control semiconductor equipment T1 to T4 through the SEMI Equipment Communication Standard (SECS), for example. It shall be noted that the present embodiment describes four control hosts as an example, but the disclosure does not limit the number of control hosts that can be controlled by one electronic device 100 through the switch device 200 when the disclosure is implemented.

In some embodiments, the switch device 200 is an IP KVM switch configured to transmit a screen signal from the control hosts CH1 to CH4 to the remote electronic device 100, to select one of the control hosts CH1 to CH4 as a controlled subject, and to transmit a control signal (e.g., an input signal of a keyboard and/or a mouse, and/or an output signal of a screen) from the remote electronic device 100 to the control host CH1, CH2, CH3, or CH4 as the controlled subject. The electronic device 100 is connected to the switch device 200, for example, via the Internet or a local area network based on the TCP/IP protocol to transmit a selection signal for selecting one of the control hosts CH1 to CH4 and transmit the control signal to the switch device 200. On the other hand, the control hosts CH1 to CH4 are respectively connected to the switch device 200 via at least one of a Video Graphic Array (VGA), a High Definition Multimedia Interface (HDMI), a Digital Visual Interface (DVI), a DisplayPort, a Universal Serial Bus (USB), a PS/2 port, and a serial port, for example, to transmit and receive the control signals such as signals of a keyboard, a screen, and/or a mouse. Accordingly, the electronic device 100 of the present embodiment can remotely control the control hosts CH1 to CH4 through relevant software such as Virtual Network Computing (VNC), for example.

In some embodiments, the switch device 200 is not limited to the IP KVM switch, and the electronic device 100 may also be physically connected to the switch device 200 similarly via at least one of the VGA, the HDMI, the DVI, the DisplayPort, the USB, the PS/2 port, and the serial port as mentioned above, for example. In other words, the disclosure does not limit here the specific connections between the switch device 200, the electronic device 100, and each of the control hosts CH1 to CH4, and persons skilled in the art shall be able to adequately adjust the teachings of the present embodiment to allow the electronic device 100 to control the control hosts CH1 to CH4 through the switch device 200.

Moreover, the disclosure does not limit the type of the semiconductor equipment. For example, each of the semiconductor equipment T1 to T4 may be one of deposition, etch, inspection, lithography, implant, annealing, repair, cleaning, loading/unloading, and other appropriate equipment. In some embodiments, the semiconductor equipment T1 to T4 is, for example, equipment of the same type that operates in a parallel manner. In some other embodiments, the semiconductor equipment T1 to T4 is, for example, equipment of different types that operates in a serial manner. For example, the semiconductor equipment T1 is controlled by the control host CH1 to perform a cleaning process; the semiconductor equipment T2 is controlled by the control host CH2 to perform an oxidation process; the semiconductor equipment T3 is controlled by the control host CH3 to perform a deposition process; and the semiconductor equipment T4 is controlled by the control host CH4 to perform a lithography process. However, the disclosure is not limited hereto.

In some embodiments, the semiconductor equipment T1 to T4 are located in a clean room and the operator is required to wear clean room garment for operating the control host CH1 to CH4 in the clean room. Therefore, the environment as illustrated in FIG. 1 is helpful to save time because the operator can remotely control the semiconductor equipment T1 to T4 without putting on the clean room garment.

Figure 2:
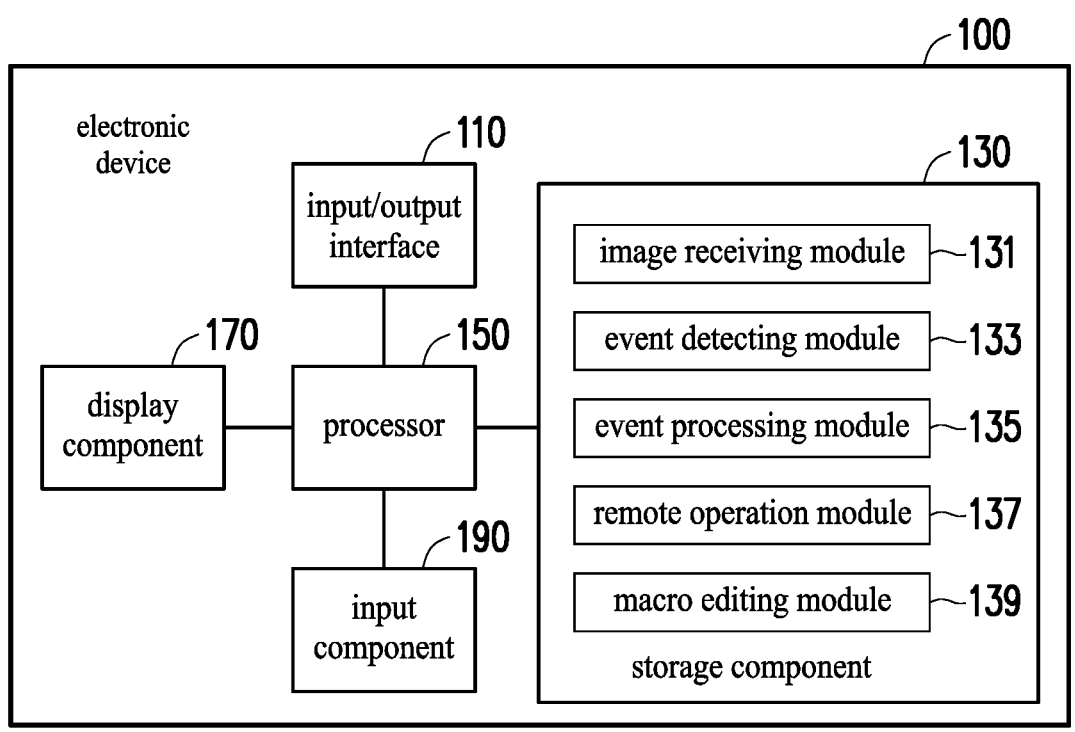
FIG. 2 is a schematic block diagram illustrating an electronic device according to an embodiment of the disclosure.

FIG. 2 is a schematic block diagram illustrating an electronic device according to an embodiment of the disclosure. Referring to FIG. 2, the electronic device 100 includes an input/output interface 110, a storage component 130, a processor 150, a display component 170, and an input component 190. In some embodiments, the electronic device 100 serves as the management host of the semiconductor equipment T1 to T4 and is an electronic device having computational capacity, such as an industrial computer, a personal computer, a laptop, and a tablet computer, but the disclosure is not limited hereto.

In some embodiments, the electronic device 100 is, for example, remotely connected to the switch device 200 via the Internet or a local area network. As such, the input/output interface 110 of the electronic device 100 includes a networking module to transmit the selection signal and the control signal of the electronic device 100 to the switch device 200 through wired or wireless networking protocols.

In some other embodiments, the electronic device 100 is physically connected to the switch device 200 via at least one of the VGA, the HDMI, the DVI, the DisplayPort, the USB, the PS/2 port, and the serial port, for example. As such, the input/output interface 110 of the electronic device 100 includes a port compatible with a connector used for connecting to the switch device 200 to transmit the selection signal and the control signal of the electronic device 100 to the switch device 200 through the connector and a physical wire.

The storage component 130 is, for example, a fixed or mobile random access memory (RAM), read-only memory (ROM), flash memory, hard disk drive in any form, another similar device, or a combination of these devices, and is configured to record a plurality of modules that can be executed by the processor 150. In the embodiments of the disclosure, the modules recorded in the storage component 130 include an image receiving module 131, an event detecting module 133, an event processing module 135, a remote operation module 137, and a macro editing module 139. In some embodiments, these modules may be implemented as a computer program, and by loading the computer program to the processor 150, the processor 150 can complete the semiconductor equipment management method. Moreover, in some embodiments, the storage component 130 further includes a database configured to record a plurality of triggering events and macros corresponding to at least some of the triggering events, and each of the macros includes at least one self-defined operation. The content of the database is, for example, self-edited by a user, or is imported from outside the electronic device 100, and the disclosure is not limited hereto. Moreover, different triggering events correspond to, for example, the same or different macros, and the disclosure is not limited hereto, either. The content of the database will be further described in the following paragraphs.

The processor 150 is, for example, a central processing unit (CPU), or a programmable microprocessor, digital signal processor (DSP), programmable controller, application specific integrated circuit (ASIC), programmable logic device (PLD) for general or specific purposes, another similar device, or a combination of these devices. In some embodiments, the processor 150 is coupled to the input/output interface 110 and the storage component 130 and can access and execute the modules or computer programs recorded in the storage component 130 to control and manage the semiconductor equipment T1 and T4 through the control hosts CH1 to CH4 and the switch device 200.

The display component 170 is, for example, a display such as a liquid crystal display (LCD), an organic light-emitting diode (OLED) display, a plasma display panel (PDP), and a field emission display (FED), is coupled to the processor 150, and is configured to display an image signal from the processor 150. Here, the disclosure does not limit the type of the display component 170 in implementation.

The input component 190 is, for example, a physical or virtual keyboard, a touch panel, a microphone, or a mouse, is coupled to the processor 150, and is configured to receive an input command or signal.

Figure 3:
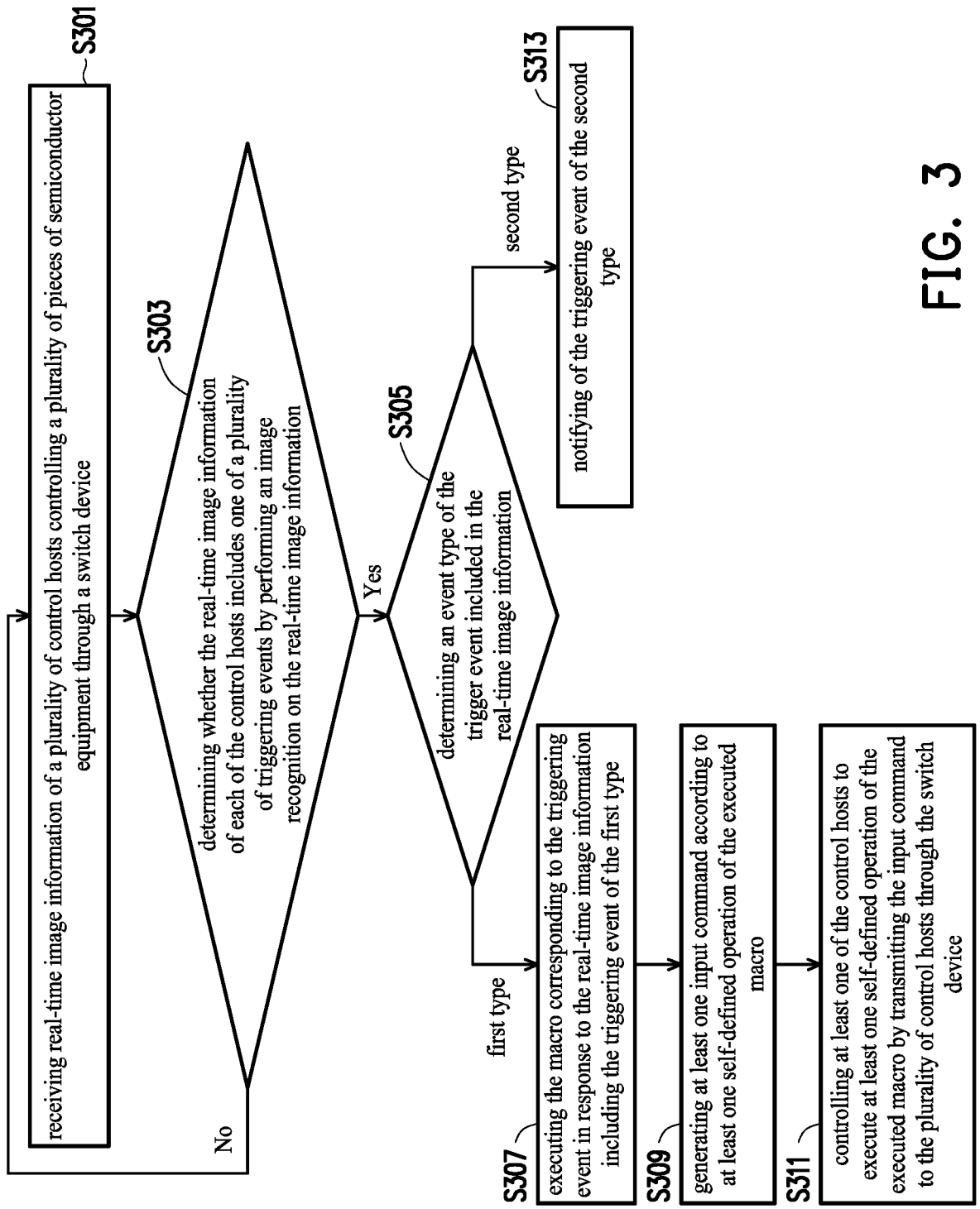
FIG. 3 is a flowchart illustrating a semiconductor equipment management method according to an embodiment of the disclosure.

FIG. 3 is a flowchart illustrating a semiconductor equipment management method according to an embodiment of the disclosure.

Referring to FIG. 1 to FIG. 3 at the same time, in step S301, the image receiving module 131 receives real-time image information of the control hosts CH1 to CH4 from the switch device 200 through the input/output interface 110. In some embodiments, the control hosts CH1 to CH4 are respectively configured to control the semiconductor equipment T1 to T4. Therefore, the real-time image information of the control hosts CH1 to CH4 is respectively used to indicate a current status of the semiconductor equipment T1 to T4.

In step S303, the event detecting module 133 determines whether the real-time image information of each of the control hosts CH1 to CH4 includes one of a plurality of triggering events by performing an image recognition on the real-time image information. If the event detecting module 133 determines that the real-time image information of each of the control hosts CH1 to CH4 includes one of a plurality of triggering events, the flow proceeds to step S305. Otherwise, the process goes back to the step S301. As mentioned in the foregoing paragraphs, the plurality of triggering events and the macros corresponding to each of the triggering events are recorded in the storage component 130 in advance. For example, the triggering events include events that generally require receiving corresponding operation commands before they can continue to operate, such as "login" and "error information". Therefore, semiconductor equipment that occurs a triggering event is usually pending and waiting for the command or the instruction from the corresponding control host. However, the disclosure does not limit the specific content of the plurality of triggering events.

It is noted that when a problem or an issue is occurred to a certain semiconductor equipment or the control host corresponding thereto, a specific pattern, text, or icon corresponding to the triggering event would be appeared on the display of the control host. Therefore, the event detecting module 133 may detect the triggering event by performing an image recognition or pattern recognition on the real-time image information came from the control hosts CH1 to CH4.

In step S305, the event detecting module 133 determines an event type of the triggering event included in the real-time image information. Specifically, the event detecting module 133 determines the event type is a first type or a second type. In some embodiment, triggering events of the first type are events that can be eliminated or excluded by the macros corresponding thereto and stored in the storage component 130. For example, the triggering event such as "login" can be an event of the first type. On the other hand, triggering events of the second type are events that cannot be eliminated or excluded by the macros stored in the storage component 130, and requires at least one decision or command from the operator. For example, the triggering event such a malfunction of the semiconductor equipment, an out-bound condition or wafer damages, etc., can be an event of the second type.

In some embodiments, if it is determined by event detecting module 133 that the event type of the triggering event included in the real-time image information is a second type, the flow proceeds to step S313. In the step S313, the processor 150 may notify the user of the second type triggering event, so that the user can conduct a remedial solution (e.g., stop the operation of the corresponding semiconductor equipment, allow the process to continue, re-work the process, etc.) by using the input component 190. For example, the processor 150 may notify the user via a prompting component (not shown) such as a speaker by making a sound prompt, but which is not limited in the disclosure. For another example, the processor 150 may notify the user via the input/output interface 110 or a communication component (not shown) separated from the input/output interface 110 to send a message (e.g., text or the real-time image) to a mobile device of the user, but which is not limited in the disclosure.

In some embodiments, if it is determined by event detecting module 133 that the event type of the triggering event included in the real-time image information is a first type, the flow proceeds to step S307. For example, the real-time image information of the control host CH1 (also referred to as a first control host) is a login image after booting, and the event detecting module 133 performs an image recognition on the real-time image of the control host CH1, determines that the triggering event "login" (also referred to as a first triggering event) is included based on the login image after booting, and the triggering event "login" belongs to the first type.

In step S307, in response to the real-time image information including a triggering event, the event processing module 135 may execute the macro corresponding to the triggering event of the first type automatically. In some embodiments, as the real-time image information of the control host CH1 includes the triggering event "login", the event processing module 135 automatically executes a macro "Login" (also referred to as a first macro) corresponding to the triggering event "login".

In step S309, according to the macro executed by the event processing module 135, the remote operation module 137 generates at least one input command according to at least one self-defined operation of the macro executed by the event processing module 135. Afterwards, in step S311, the remote operation module 137 controls the control hosts CH1 to CH4 to execute the at least one self-defined operation of the macro executed by the event processing module 135 by transmitting the input command to the control hosts CH1 to CH4 through the input/output interface 110 and the switch device 200.

In some embodiments, as the event processing module 135 executes the macro "Login", and the macro "Login" is configured to log in one single control host, the remote operation module 137 generates a plurality of input commands according to a plurality of self-defined operations of the macro "Login", and then controls the control host CH1 to execute the self-defined operations of the macro "Login" by transmitting the input commands to the control host CH1 through the input/output interface 110 and the switch device 200. As such, the control host CH1 may perform the self-defined operations of the macro "Login" in response to the input commands received by the control host CH1 from the electronic device 100.

In some embodiments, while the remote operation module 137 controls the first control host to execute the plurality of self-defined operations of the first macro according to the first macro and the real-time image information of the first control host, the real-time image information of the control host CH2 (also referred to as a second control host) includes, for example, a second triggering event. Similarly, in response to the real-time image information of the second control host including the second triggering event, the event processing module 135 executes a macro (also referred to as a second macro) corresponding to the second triggering event of the first type automatically. When the second macro is configured to execute an operation on the second control host, the remote operation module 137 generates at least one input command according to at least one self-defined operation of the second macro, and then controls the second control host to execute the self-defined operation of the second macro by transmitting the generated input command to the second control host through the input/output interface 110 and the switch device 200. As such, the control host CH2 may perform the self-defined operations of the second macro in response to the input commands received by the control host CH2 from the electronic device 100 while the control host CH1 performs the self-defined operations of the first macro in response to the input commands received by the control host CH1 from the electronic device 100.

Embodiments are provided below to illustrate the semiconductor equipment management method of the disclosure.

Figure 4:
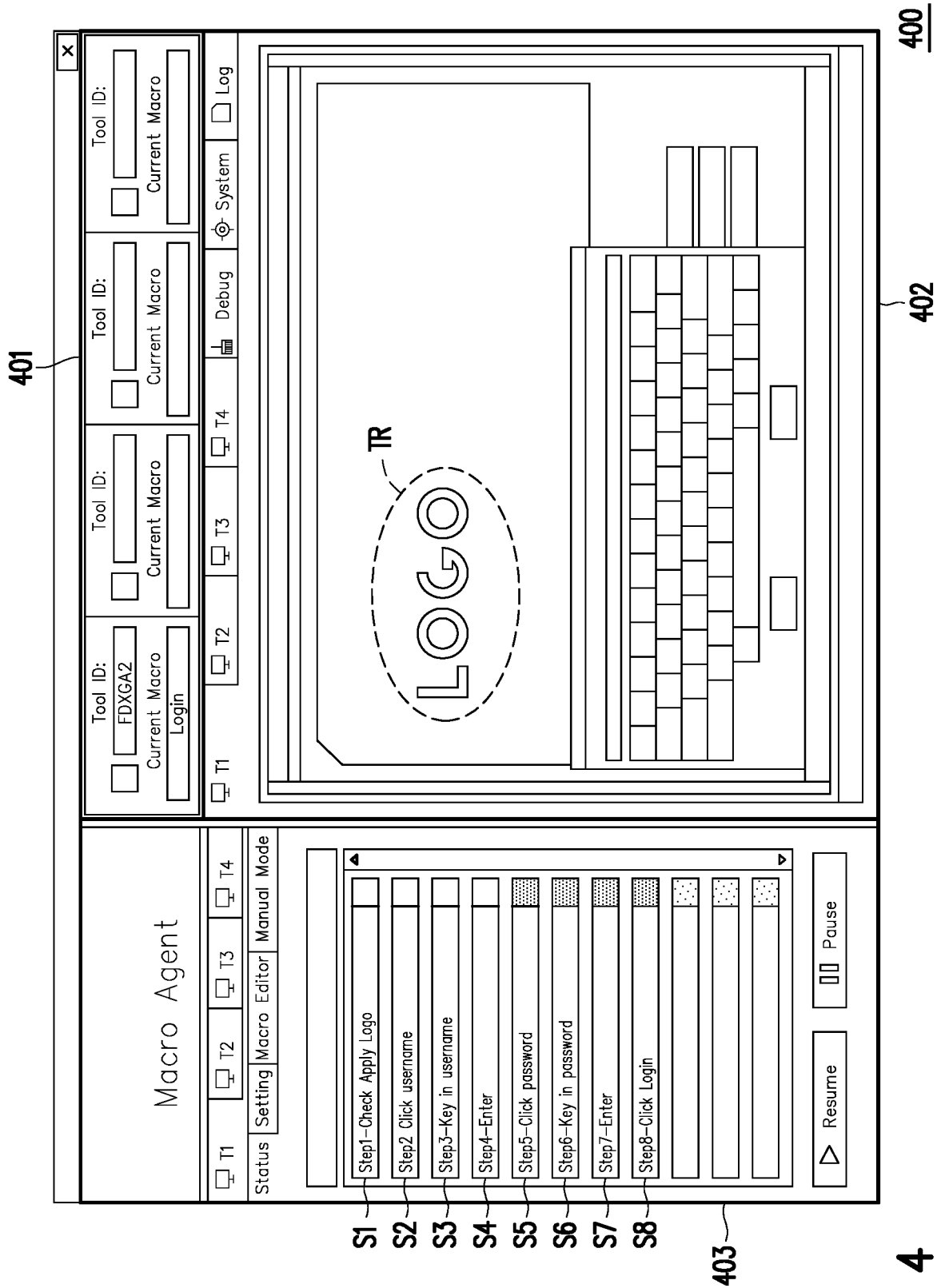
FIG. 4 is a schematic diagram illustrating a user interface according to an embodiment of the disclosure.

FIG. 4 is a schematic diagram illustrating a user interface according to an embodiment of the disclosure. In some embodiments, the electronic device 100 provides a user interface through the display component 170 to display the received real-time image information of the control host CH1 to CH4 to allow the user to view the current status of the semiconductor equipment T1 to T4. Referring to FIG. 4, a user interface 400 includes a first status area 401, a second status area 402, and a third status area 403.

The first status area 401 is configured to display names of the semiconductor equipment controlled by each of the control hosts and the macros being correspondingly executed by the electronic device 100. As illustrated in FIG. 4, the name of the semiconductor equipment T1 is "FDXGA2" and corresponding to the semiconductor equipment T1, and the electronic device 100 is executing the macro "Login".

The second status area 402 is configured to display the real-time image information of one of the control hosts. In the second status area 402, the user selects the real-time image information of the control host to be viewed through the input component 190. As illustrated in FIG. 4, the second status area 402 displays the real-time image information of the control host CH1, which controls the semiconductor equipment T1.

For example, the login image after booting of the control host CH1 includes a desktop logo TR in the second status area 402. Therefore, the event detecting module 133 performs image recognition or pattern recognition on the real-time image information of the control hosts CH1 to CH4. When the real-time image information of the control host CH1 includes the desktop logo TR, it is determined that the real-time image information of the control host CH1 includes the login image after booting including the triggering event "login", so the event processing module 135 correspondingly executes the macro "Login".

It shall be noted that different triggering events may have different determination methods and may correspond to different macros. Persons skilled in the art shall be able to set determination methods respectively for a plurality of triggering events and corresponding macros on their own based on the teachings in the description, and the disclosure is not limited hereto.

The third status area 403 is configured to display an execution status of the macro executed by the electronic device 100 corresponding to one of the control hosts. For example, the third status area 403 sequentially lists at least one self-defined operation of the executed macro and indicates the execution status of each of the self-defined operations by using different status light signals. In the third state area 403, the user selects the control host to be viewed through the input component 190. As illustrated in FIG. 4, the third status area 403 displays the execution status of the macro "Login". Specifically, the macro "Login" includes eight self-defined operations S1 to S8, and the self-defined operations S1 to S4 have been executed (with the status lights on illustrated in white in FIG. 4, for example), and the self-defined operations S5 to S8 have not been executed (with the status lights off illustrated in dark grey in FIG. 4, for example).

In the semiconductor equipment management method of some embodiments, the macro editing module 139 further provides an editing interface through the display component 170. The user may use the input component 190 to issue an edit command through the editing interface to construct a plurality of triggering events, and a plurality of determination methods and a plurality of macros corresponding to the constructed triggered events, and to edit at least one self-defined operation of each of the macros and record results of editing in the storage component 130. Accordingly, the event detecting module 133, the event processing module 135, and the remote operation module 137 can operate according to the content edited by the user recorded in the storage component 130.

In some embodiments, the semiconductor equipment T1 to T4 are set in a fabrication factory (fab) which runs twenty-four-seven, the user interface displayed by the display component 170 helps to allow the user to monitor the fab for problems or issues occurred in the semiconductor equipment T1 to T4. Once any of the semiconductor equipment T1 to T4 is down, the user may fix the problem immediately, so as to avoid the process flow being delayed.

FIG. 5 is a schematic diagram illustrating editing a plurality of self-defined operations of a macro according to an embodiment of the disclosure. Referring to FIG. 5, an editing interface 500 is configured to allow the user to edit one single macro to set a plurality of self-defined operations therein and an operation sequence of the plurality of self-defined operations. In some embodiments, the editing interface 500 includes columns including an identification number 501, an operation name 502, an operation function 503, parameter information 504, process fail information 505, process success information 506, and delay time 507. The identification number 501 and the operation name 502 are used as indicators or instructions of the self-defined operations and shall not be redundantly described here. Particularly, the editing interface 500 as illustrated in FIG. 5 is a graphical user interface, and the user can easily and intuitively edit the operations through the editing interface 500.

In some embodiments, the operation function 503 includes at least one of image recognition, clicking, and character input. The image recognition further includes full screen image recognition for finding image in the whole screen and ROI (region of interest) image recognition for finding image in only an interested region of the screen, and the character input includes inputting at least one of control characters, at least one printable character, or key combinations. The parameter information 504 records execution parameters configured to execute each of the self-defined operations.

For example, the self-defined operation of identification number 1 includes ROI image recognition in the column of the operation function 503, the self-defined operation of identification number 2 includes ROI image recognition and clicking in the column of the operation function 503, and the self-defined operation of identification number 3 includes full screen image recognition and clicking in the column of the operation function 503, where the parameters (e.g., image files to match, locations of the region of interest, etc.) used for executing image recognition are recorded in the column of the parameter information 504. Moreover, as the self-defined operation of identification number 15 includes inputting control characters in the column of the operation function 503, the inputted control character "End" is recorded in the column of the parameter information 504. As the self-defined operation of identification number 16 includes inputting one single printable character in the column of the operation function 503, the inputted printable character "f" is recorded in the column of the parameter information 504. In some embodiments, the operation function 503 further includes sending a text message to transmit a specific message to a specific mobile phone number and/or e-mail address, and the content of the specific message, the mobile phone number, and/or the e-mail address are recorded in the column of the parameter information 504.

Embodiments are provided below to illustrate the parameter information of the present embodiment. Persons skilled in the art shall be able to construct editing methods and use methods of the parameter information corresponding to various self-defined operations.

Figure 6:
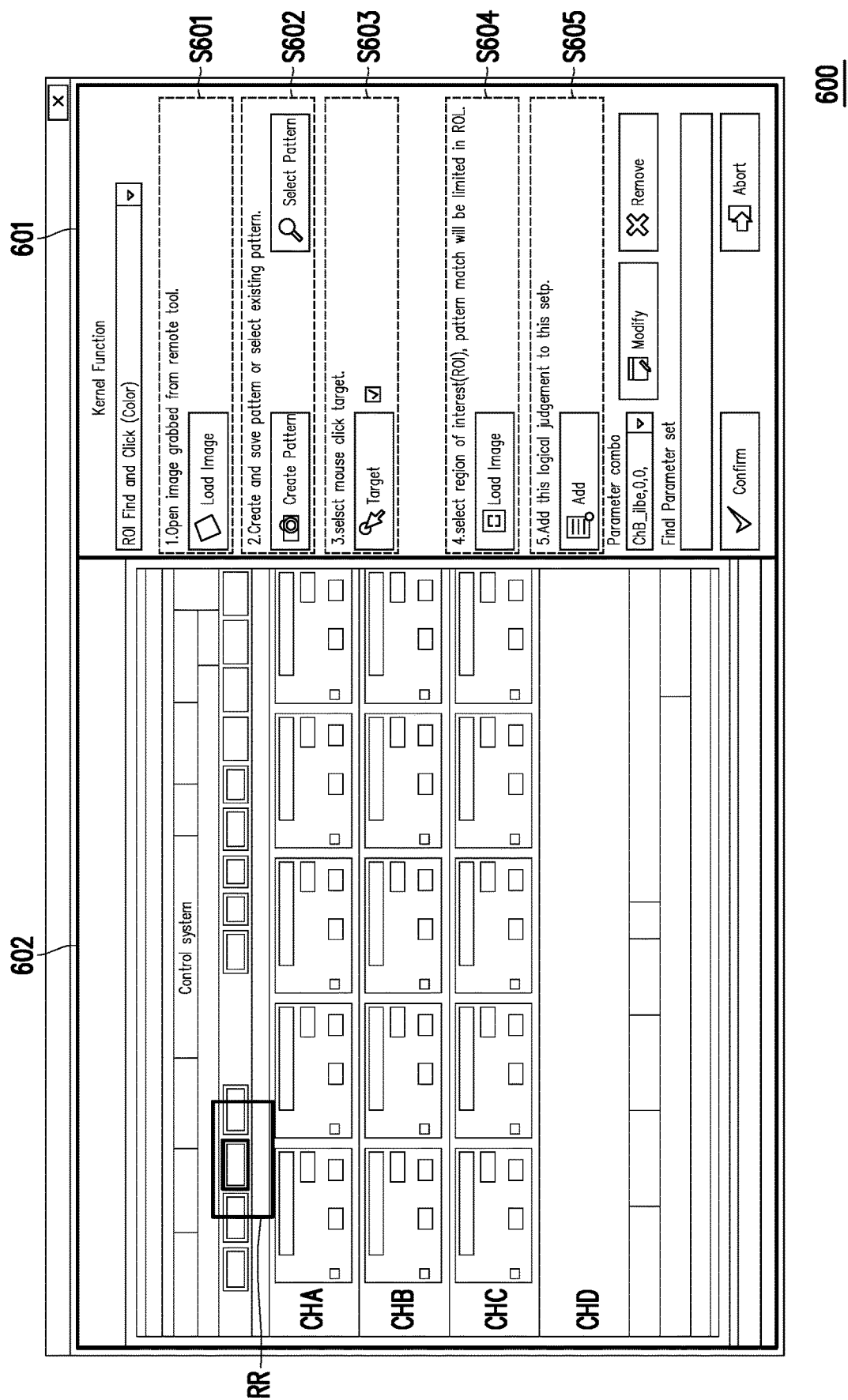
FIG. 6 is a schematic diagram illustrating editing parameter information according to an embodiment of the disclosure.

FIG. 6 is a schematic diagram illustrating editing parameter information according to an embodiment of the disclosure.

Referring to FIG. 6, an editing interface 600 is configured to allow the user to edit the parameters used for executing the operation function when the operation function includes ROI image recognition and clicking. As illustrated in FIG. 6, the editing interface 600 includes a setting area 601 and an image area 602. The setting area 601 displays steps S601 to S605 in editing the parameter information. In step S601, the user selects the real-time image information to display it in the image area 602. In step S602, the user constructs or selects a pattern or a text to be matched. Specifically, the selected real-time image information and pattern or text are, for example, stored by the user in the storage component 130 in advance for editing the macros, but the disclosure is not limited hereto. In step S603, the user selects a location to click when the real-time image information includes a matching pattern or text. In step S604, the user selects a region of interest RR through the image area 602 to limit the electronic device 100 to perform the operation of image recognition or pattern recognition in the region of interest only. In step S605, the user selects whether to add other parameter information to the corresponding operation function. For example, the user may execute steps S601 to S604 to set the parameter information to set "click a first pattern in a first region of interest of first real-time image information" to the operation function of a specific self-defined operation. Afterwards, the user may select addition in step S605, and execute steps S601 to S604 again to add parameter information to add "click a second pattern in a second region of interest of second real-time image information" to the operation function of the same self-defined operation. Accordingly, as long as one of "click a first pattern in a first region of interest of first real-time image information" and "click a second pattern in a second region of interest of second real-time image information" is successfully executed, it means that the corresponding operation function is successfully executed. Therefore, the user can set composite parameter information corresponding to the operation function of the same self-defined operation to reduce a probability of execution failure of the operation function. Particularly, the editing interface 600 of the present embodiment is a graphical user interface, and the user can easily and intuitively edit the operations.

Referring to FIG. 5 again, the process fail information 505 is configured to indicate an identification number of a next self-defined operation to be subsequently executed when execution of the operation function in the corresponding self-defined operation fails, and the process success information 506 is configured to indicate an identification number of a next self-defined operation to be subsequently executed when execution of the operation function in the corresponding self-defined operation is successful.

For example, the columns of the process fail information 505 and the process success information 506 of the self-defined operation of identification number 9 respectively record 8 and 10. Therefore, if the self-defined operation of identification number 9 successfully completes ROI image recognition and clicking, the self-defined operation of identification number 10 is subsequently executed. If the self-defined operation of identification number 9 does not successfully complete ROI image recognition and clicking, the self-defined operation of identification number 8 is subsequently executed. In some embodiments, the electronic device 100, for example, sets a time threshold and a completed pattern or a completed text. If the completed pattern or the completed text does not appear in the real-time image information by the time threshold, it is determined that execution of the operation function of the self-defined operation fails. Otherwise, it is determined that execution of the operation function of the self-defined operation is successful. It shall be noted that the disclosure does not limit here the method for determining whether execution of the operation function in the self-defined operation is successful. Persons skilled in the art shall be able to configure the setting according to their needs.

The delay time 507 is configured to indicate a waiting time before a next self-defined operation is executed after execution of the operation function in the self-defined operation is completed.

Accordingly, through the user interface and the editing interface provided in the exemplary embodiments of the disclosure, the user can construct the macros corresponding to the plurality of triggering events as well as the plurality of self-defined operations in each of the macros and their operation sequence according to different needs.

In some embodiments, the user takes precautions against errors that are likely to occur in the real-time image information when setting the operation sequence of the plurality of self-defined operations. For example, the event processing module 135 executes a macro including a first self-defined operation, a second self-defined operation, and a third self-defined operation. The first self-defined operation includes executing a first image recognition in the first region of interest to determine whether the real-time image information includes the first pattern or the first text. If the real-time image information includes the first pattern or the first text, clicking is performed on a location of the first pattern or the first text. Moreover, if execution of the first self-defined operation is successful, the third self-defined operation is subsequently executed. If execution of the first self-defined operation fails, the second self-defined operation is subsequently executed.

Since the user is already aware that the second pattern or the second text is included at a relative location (e.g., 2 cm away at a lower-right side) to the first pattern or the first text when editing the macro, the second self-defined operation is set to perform a second image recognition in the second region of interest at the relative location (e.g., 2 cm away at a lower-right side) to the first region of interest to determine whether the second pattern or the second text is included therein. If it is, clicking is performed according to the location of the second pattern or the second text and the relative location (namely, clicking at a location 2 cm away at an upper-left side from the location of the second pattern or the second text).

In some embodiments, parameters of several steps including the identification number 501, the operation name 502, the operation function 503, the parameter information 504, the process fail information 505, the process success information 506, and the delay time 507 within a macro of a same kind can be stored in the storage component 130 previously, such that the steps stored in the storage component 130 can be loaded when editing the macro. As such, the editing time for the user can be saved.

Taking the "Login" macro illustrated in FIG. 4 as an example, parameters of the steps except for the step S3 "Key in username" and the step S6 "Key in password" are usually unchanged. Therefore, the steps S1, S2, S4, S5, S7, and S8 are previously stored in the storage component 130 in some embodiments, such that these steps can be directly called without being repeatedly edited when the user edits the "Login" macro.

In some embodiments, when running a process on semiconductor equipment, recipes of the running process may be automatically edited as a macro and stored in the storage component 130 along with the wafer run lot. Therefore, the macro can be executed automatically once a wafer is identified with a certain recipe. As such, the editing time for the user can be saved as well.

According to some embodiments, a semiconductor equipment management method for managing a plurality of pieces of semiconductor equipment through an electronic device is provided. The plurality of pieces of semiconductor equipment are respectively controlled through a plurality of control hosts. The semiconductor equipment management method includes: receiving, by the electronic device, real-time image information of each of the control hosts controlling the plurality of pieces of semiconductor equipment through a switch device, where the plurality of control hosts and the electronic device are connected to the switch device; determining, by the electronic device, whether the real-time image information of each of the control hosts includes one of a plurality of triggering events by performing an image recognition on the real-time image information; executing, by the electronic device, a macro corresponding to the triggering event included in the real-time information, where the macro includes at least one self-defined operation; generating, by the electronic device, at least one input command according to the at least one self-defined operation of the executed macro; and controlling, by the electronic device, the plurality of control hosts to execute the at least one self-defined operation of the executed macro by transmitting the input command to the plurality of control hosts through the switch device.

According to some embodiments, an electronic device for controlling a plurality of pieces of semiconductor equipment includes an input/output interface, a storage component and a processor. The plurality of pieces of semiconductor equipment are respectively controlled through a plurality of control hosts. The input/output interface is connected to a switch device and configured to input and output signals, where the switch device is connected to the plurality of control hosts. The storage component is configured to record a plurality of macros, where each of the macros corresponds to one of a plurality of triggering events and includes at least one self-defined operation. The processor is coupled to the input/output interface and the storage component and configured to: receive real-time image information of each of the control hosts controlling the plurality of pieces of semiconductor equipment through the switch device and the input/output interface; determine whether the real-time image information of each of the control hosts includes one of the plurality of triggering events by performing an image recognition on the real-time image information; execute a macro corresponding to the triggering event included in the real time image information; generate at least one input command according to the at least one self-defined operation of the executed macro; and control the plurality of control hosts to execute the at least one self-defined operation of the executed macro by transmitting the input command to the plurality of control hosts through the input/output interface and the switch device.

According to some embodiments, a non-transitory computer readable storage medium is stored with a program code, so that an electronic device loads the program code to execute a semiconductor equipment management method. The semiconductor equipment management method includes: receiving real-time image information of a plurality of control hosts controlling a plurality of pieces of semiconductor equipment through a switch device, where the plurality of control hosts and the electronic device are connected to the switch device; determining whether the real-time image information of each of the control hosts includes one of a plurality of triggering events by performing an image recognition on the real-time image information; executing a macro corresponding to the triggering event included in the real-time image information, where the macro includes at least one self-defined operation; generating at least one input command according to the at least one self-defined operation of the executed macro; and controlling the plurality of control hosts to execute the at least one self-defined operation of the executed macro by transmitting the input command to the plurality of control hosts through the switch device.

In summary of the above, in the semiconductor equipment management method, the electronic device, and the computer program provided in the exemplary embodiments of the disclosure, the electronic device is connected to the switch device, and the control hosts controlling the semiconductor equipment are also connected to the switch device, such that the plurality of pieces of semiconductor equipment can be remotely managed simultaneously. Moreover, in the editing interface provided in the exemplary embodiments of the disclosure, the user can easily and intuitively set the macros correspondingly executed when the plurality of triggering events of the semiconductor equipment occurs and edit the plurality of self-defined operations in each of the macros and their operation sequence. Accordingly, routine control and management operations can be performed on the plurality of pieces of semiconductor equipment in an automated manner, and unexpected sudden events can be eliminated by using the macros set in advance, which significantly saves the management time and management costs for the semiconductor equipment.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A semiconductor equipment management method, adapted for an electronic device, the semiconductor equipment management method comprising:
    detecting one of a plurality of triggering events appeared in real-time image information received from each of a plurality of control hosts respectively controlling a plurality of semiconductor equipment through image recognition;
    executing a macro corresponding to the detected triggering event to generate at least one input command according to at least one self-defined operation comprised in the executed macro, wherein the self-defined operation comprises an operation function, process fail information, and process success information; and
    controlling the respective control hosts to execute the at least one self-defined operation by transmitting the at least one input command to the respective control hosts comprising:
        controlling the respective control hosts to execute an operation function of a first self-defined operation by transmitting one of the at least one input command to the respective control hosts;
        controlling the respective control hosts to execute an operation function of a second self-defined operation by transmitting one of the at least one input command to the respective control hosts according to the process fail information when it is determined by the electronic device that execution of the operation function of the first self-defined operation fails; and
        controlling the respective control hosts to execute an operation function of a third self-defined operation by transmitting one of the at least one input command to the respective control hosts according to the process success information when it is determined by the electronic device that execution of the operation function of the first self-defined operation is successful.

2. The semiconductor equipment management method according to claim 1, further comprising:
    executing a first macro corresponding to a first triggering event comprised in the real-time image information of a first control host among the plurality of control hosts to generate at least one first input command according to at least one self-defined operation of the first macro, and controlling the first control host to execute the at least one self-defined operation of the first macro by transmitting the first input command to the first control host.

3. The semiconductor equipment management method according to claim 2, further comprising:
    executing a second macro corresponding to a second triggering event comprised in the real-time image information of a second control host among the plurality of control hosts to generate at least one second input command according to at least one self-defined operation of the second macro, and controlling the second control host to execute the at least one self-defined operation of the second macro by transmitting the second input command to the second control host.

4. The semiconductor equipment management method according to claim 1, wherein the step of executing the operation function of the first self-defined operation comprises:
    executing at least one of a first image recognition, clicking, and character input,
    wherein the first image recognition comprises determining whether the real-time image information comprises a first pattern or a first text, and
    wherein the character input comprises inputting at least one of control characters, at least one printable character, or key combinations.

5. The semiconductor equipment management method according to claim 4, wherein the step of executing the operation function of the first self-defined operation after executing the first image recognition further comprises:
    performing clicking according to a location of the first pattern or the first text when it is determined by the electronic device that the real-time image information comprises the first pattern or the first text.

6. The semiconductor equipment management method according to claim 5, wherein the step of determining whether the real-time image information comprises the first pattern or the first text comprises:
    selecting a first region of interest in the real-time image information; and
    determining whether the first region of interest comprises the first pattern or the first text.

7. The semiconductor equipment management method according to claim 6, further comprising:
    controlling the respective control hosts to execute the operation function of the second self-defined operation by transmitting one of the at least one input command to the respective control hosts according to the process fail information when it is determined by the electronic device that the first region of interest does not comprise the first pattern and the first text,
    wherein the step of executing the operation function of the second self defined operation comprises:
        selecting a second region of interest in the real-time image information;
        determining whether the second region of interest comprises a second pattern or a second text; and
        performing clicking according to a location of the second pattern or the second text and a relative location relationship between the first region of interest and the second region of interest when the second region of interest comprises the second pattern or the second text.

8. The semiconductor equipment management method according to claim 1, further comprising:
providing an editing interface, wherein the editing interface is a graphical user interface;
receiving an edit command through the editing interface to construct a plurality of macros corresponding to the plurality of triggering events and edit the at least one self-defined operation of each of the macros; and
recording the plurality of edited macros in a storage component.

9. An electronic device for controlling a plurality of pieces of semiconductor equipment, comprising:
an input/output interface, connected to a plurality of control hosts controlling the respective semiconductor equipment through a switch device and configured to input and output signals;
a storage component, configured to record a plurality of macros, wherein each of the macros corresponds to one of a plurality of triggering events and comprises at least one self-defined operation; and
a processor coupled to the input/output interface and the storage component and configured to:
receive real-time image information of each of the plurality of control hosts controlling the plurality of pieces of semiconductor equipment through the switch device and the input/output interface;
detect one of a plurality of triggering events appeared in the real-time image information through image recognition;
execute a macro corresponding to the detected triggering event to generate at least one input command according to at least one self-defined operation comprised in the executed macro, wherein the self-defined operation comprises an operation function, process fail information, and process success information; and
control the respective control hosts to execute the at least one self-defined operation by transmitting the at least one input command to the respective control hosts through the input/output interface and the switch device,
wherein the processor is configured to:
control the respective control hosts to execute an operation function of a first self-defined operation by transmitting one of the at least one input command to the respective control hosts through the input/output interface and the switch device;
control the respective control hosts to execute an operation function of a second self-defined operation by transmitting one of the at least one input command to the respective control hosts through the input/output interface and the switch device according to the process fail information when it is determined by the processor that execution of the operation function of the first self-defined operation fails; and
control the respective control hosts to execute an operation function of a third self-defined operation by transmitting one of the at least one input command to the respective control hosts through the input/output interface and the switch device according to the process success information when it is determined by the processor that execution of the operation function of the first self-defined operation is successful.

10. The electronic device according to claim 9, wherein the processor is configured to execute a first macro corresponding to a first triggering event comprised in the real-time image information of a first control host among the plurality of control hosts to generate at least one first input command according to at least one self-defined operation of the first macro, and control the first control host to execute at least one self-defined operation of the first macro by transmitting the first input command to the first control host through the switch device.

11. The electronic device according to claim 10, wherein the processor is configured to execute a second macro corresponding to a second triggering event comprised in the real-time image information of a second control host among the plurality of control hosts to generate at least one second input command according to at least one self-defined operation of the second macro, and control the second control host to execute at least one self-defined operation of the second macro by transmitting the second input command to the second control host through the switch device.

12. The electronic device according to claim 9,
wherein the processor is configured to:
execute at least one of a first image recognition, clicking, and character input,
wherein the first image recognition comprises determining whether the real-time image information comprises a first pattern or a first text, and
wherein the character input comprises inputting at least one of control characters, at least one printable character, or key combinations.

13. The electronic device according to claim 12, wherein after executing the first image recognition, the processor is configured to:
perform clicking according to a location of the first pattern or the first text when it is determined by the processor that the real-time image information comprises the first pattern or the first text.

14. The electronic device according to claim 13, wherein the processor is configured to:
select a first region of interest in the real-time image information; and
determine whether the first region of interest comprises the first pattern or the first text.

15. The electronic device according to claim 14, wherein when it is determined by the processor that the first region of interest does not comprise the first pattern and the first text, the processor is configured to control the respective control hosts to execute the operation function of the second self-defined operation by transmitting one of the at least one input command to the respective control hosts through the input/output interface and the switch device according to the process fail information.

16. The electronic device according to claim 15, wherein when the processor executes the operation function of the second self-defined operation, the processor is configured to:
selecting a second region of interest in the real-time image information;
determining whether the second region of interest comprises a second pattern or a second text; and
performing clicking according to a location of the second pattern or the second text and a relative location relationship between the first region of interest and the second region of interest when the second region of interest comprises the second pattern or the second text.

17. The electronic device according to claim 9, further comprising:

a display component coupled to the processor and configured to display an image; and an input component coupled to the processor and configured to receive a command, wherein the processor is further configured to:

provide an editing interface through the display component;

receive an edit command from the input component through the editing interface to construct the plurality of macros corresponding to the plurality of triggering events and edit the at least one self-defined operation of each of the macros; and record the plurality of edited macros in the storage component, wherein the editing interface is a graphical user interface.

18. A non-transitory computer readable storage medium storing program codes, wherein an electronic device loads the program codes to execute:

detecting one of a plurality of triggering events appeared in real-time image information received from each of a plurality of control hosts respectively controlling a plurality of semiconductor equipment through image recognition;

executing a macro corresponding to the detected triggering event to generate at least one input command according to at least one self-defined operation comprised in the executed macro, wherein the self-defined operation comprises an operation function, process fail information, and process success information; and controlling the respective control hosts to execute the at least one self-defined operation by transmitting the at least one input command to the respective control hosts, comprising:

controlling the respective control hosts to execute an operation function of a first self-defined operation by transmitting one of the at least one input command to the respective control hosts;

controlling the respective control hosts to execute an operation function of a second self-defined operation by transmitting one of the at least one input command to the respective control hosts according to the process fail information when it is determined by the electronic device that execution of the operation function of the first self-defined operation fails; and controlling the respective control hosts to execute an operation function of a third self-defined operation by transmitting one of the at least one input command to the respective control hosts according to the process success information when it is determined by the electronic device that execution of the operation function of the first self-defined operation is successful.

19. The non-transitory computer readable storage medium according to claim 18, further comprising:

executing a first macro corresponding to a first triggering event comprised in the real-time image information of a first control host among the plurality of control hosts to generate at least one first input command according to at least one self-defined operation of the first macro, and controlling the first control host to execute the at least one self-defined operation of the first macro by transmitting the first input command to the first control host.

20. The non-transitory computer readable storage medium according to claim 19, further comprising:

executing a second macro corresponding to a second triggering event comprised in the real-time image information of a second control host among the plurality of control hosts to generate at least one second input command according to at least one self-defined operation of the second macro, and controlling the second control host to execute the at least one self-defined operation of the second macro by transmitting the second input command to the second control host.

* * * * *